Oct. 11, 1938.  R. W. HALL  2,132,951
POWER TRANSMISSION MECHANISM
Filed March 4, 1935   3 Sheets-Sheet 1
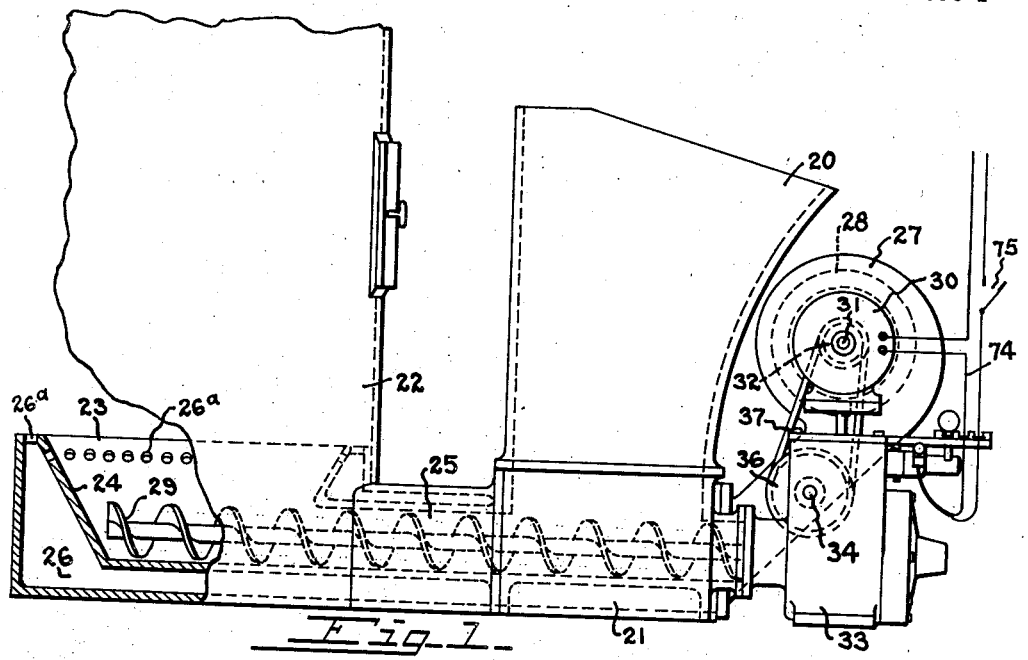
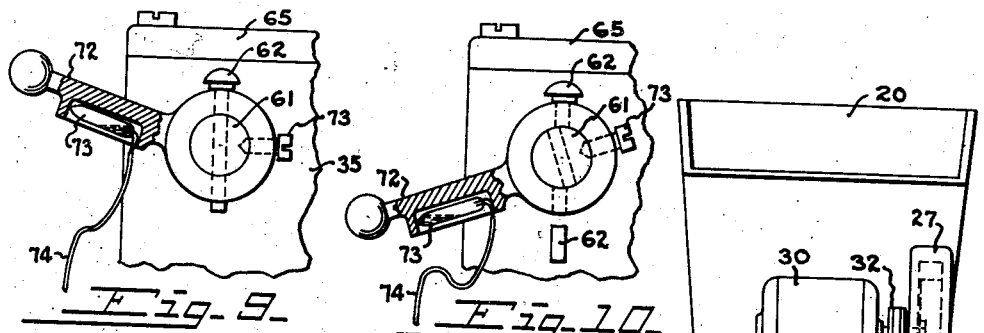
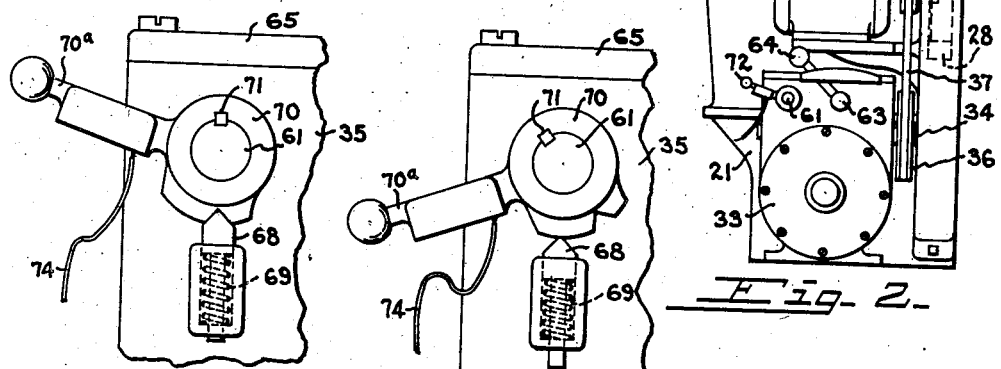
INVENTOR
RALPH W. HALL.
BY
H. C. Karel.
ATTORNEY

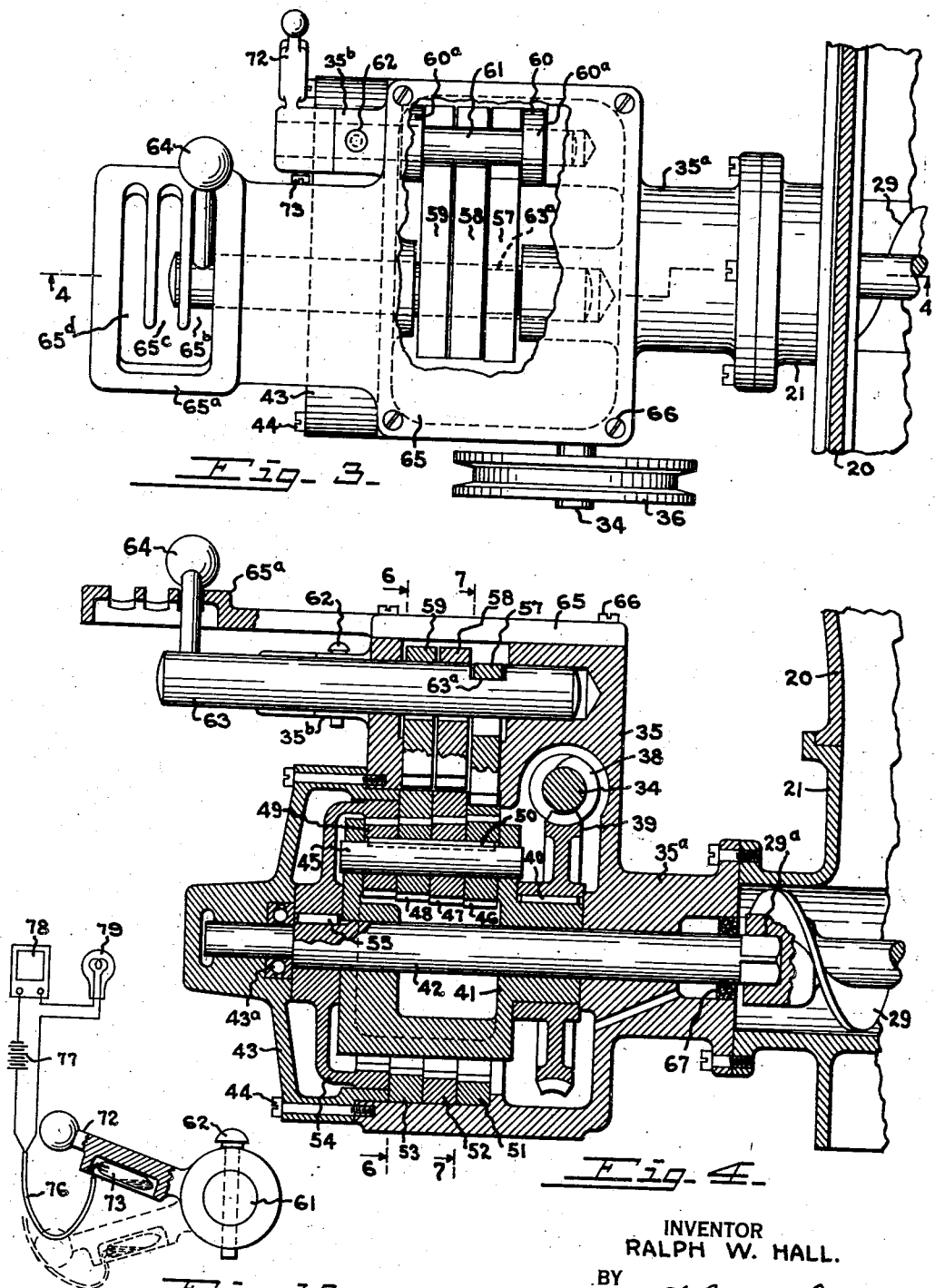

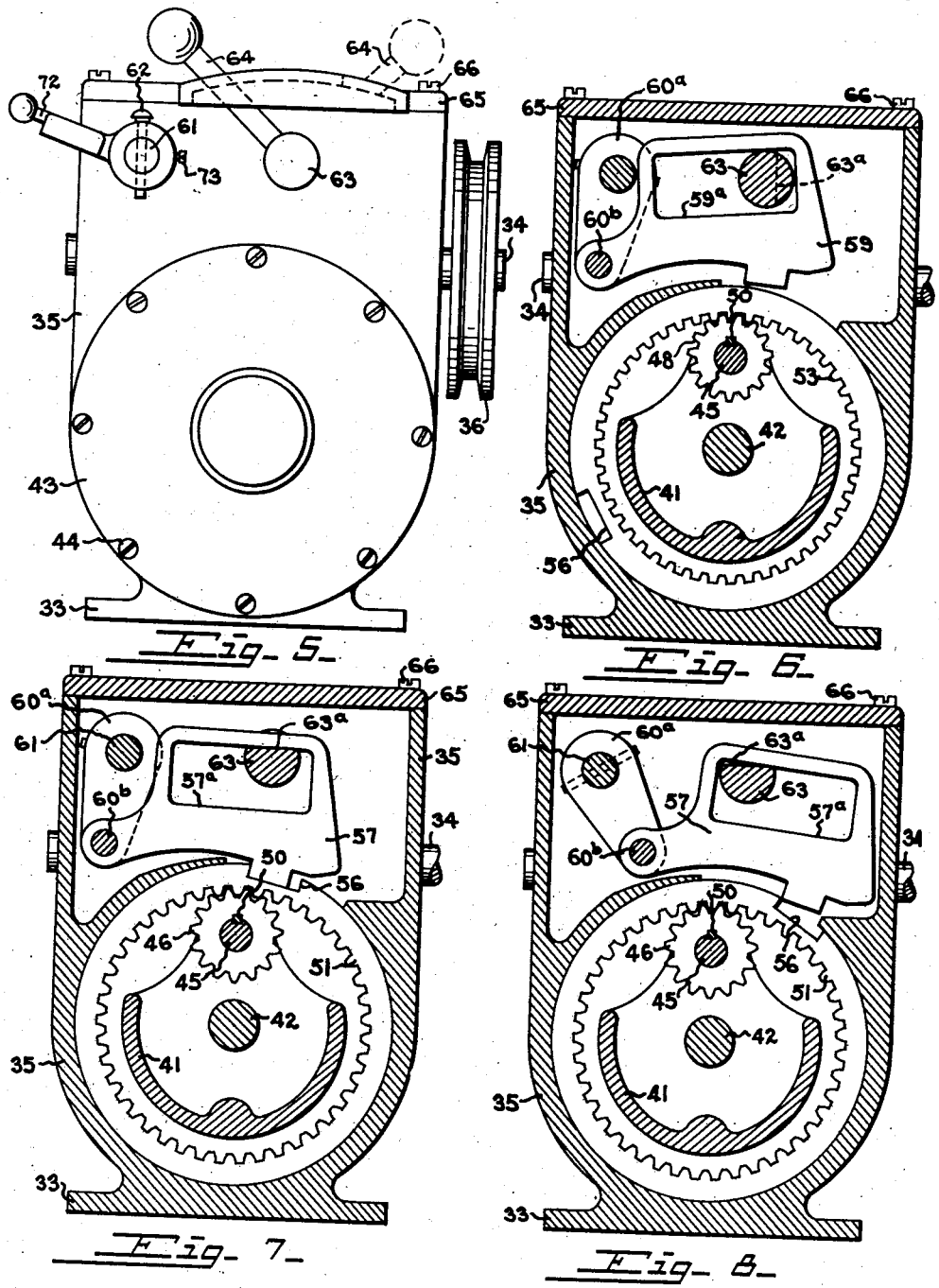

Patented Oct. 11, 1938

2,132,951

UNITED STATES PATENT OFFICE 2,132,951

POWER TRANSMISSION MECHANISM

Ralph W. Hall, Wyoming, Ohio, assignor to The E. H. Bardes Range & Foundry Company, Cincinnati, Ohio, a corporation of Ohio Application March 4, 1935, Serial No. 9,281

4 Claims. (Cl. 74—277)

This invention relates to power transmission mechanism generally and particularly to those in which the driven member is automatically released from operative connection with the driver when the driven member is subjected to an abnormal load.

The invention is particularly suitable for driving the screw conveyor of an automatic stoker and controlling the speed thereof. In such it is common practice to employ a severable connection, such as a shear-pin, as the driving coupling between the power transmission device and the conveyor, in order to protect the mechanism against damage when any hard foreign element that may be in the coal becomes caught in the conveyor causing it to jam, in which case, the obstruction must be removed and the severed shear-pin replaced with a new one before normal operation of the stoker can be resumed. The customary location of the shear-pin makes it difficult and somewhat hazardous for the novice to remove the mutilated and broken pin and to insert a new one—and this is always a dirty job that is hated by everyone.

Therefore, one object of this invention is the provision of a power-transmission device comprising a novel arrangement of planetary gearing and associated mechanism and which includes a driven shaft having a non-severable connection with the conveyor.

Another object is the provision of transmission mechanism having a safety device, in the form of a shear-pin or its equivalent, which is engaged with a normally dormant element under stress and which will serve to automatically release the mechanism from driving relation with the conveyor, regardless of the non-severable connection therebetween, when the conveyor becomes jammed by lodgement of foreign matter or otherwise becomes overloaded.

Another object is to provide an arrangement of the safety device whereby the shear-pin, or its equivalent, is readily accessible and so simplified that replacement or resetting thereof may be made easily and quickly by the merest novice without the use of any tools.

Another object is to provide means for indicating the functional status of the safety device.

Another object is the provision of means, associated with the safety device, whereby an electric circuit may be automatically opened or closed when the transmission gearing is released from driving relation with the conveyor as aforesaid.

These and other objects will be apparent from the following description and accompanying drawings in which:

Fig. 1 is a side elevation of a stoker mechanism embodying this invention.

Fig. 2 is a front elevation of the hopper and the driving mechanism for the stoker.

Fig. 3 is a plan view of the power-transmission and speed-regulating device.

Fig. 4 is a longitudinal sectional elevation, taken substantially on a line 4—4 of Fig. 3.

Fig. 5 is an end elevation of the power-transmission and speed-regulating device.

Fig. 6 is a cross-sectional elevation, taken substantially on a line 6—6 of Fig. 4, showing the planetary gearing of one speed ratio and its associated mechanism as released from driving relation.

Fig. 7 is a cross-sectional elevation, taken substantially on a line 7—7 of Fig. 4, showing the planetary gearing of another speed ratio with its associated mechanism in driving relation.

Fig. 8 is a cross-sectional elevation, similar to Fig. 7, showing the same planetary gearing and associated mechanism at the instant of being released from driving relation.

Fig. 9 is an end view of a form of safety device, in which a shear-pin is employed to define and hold the detent crank-shaft in position under stress for driving relation of the planetary gearing.

Fig. 10 is a companion view to Fig. 9, showing the position of the detent crank-shaft when the planetary gearing is released from driving relation by the severing of the shear-pin due to an overload.

Fig. 11 is an end view of another form of safety device, in which means other than a shear-pin is employed to define and hold the detent crank-shaft in position under stress for driving relation of the planetary gearing.

Fig. 12 is a companion view to Fig. 11, showing the position of the detent crank-shaft when the planetary gearing is released from driving relation by an overload on the retaining means.

Fig. 13 is an end view of one of the forms of safety device, showing the adaptation of an annunciator control.

In the drawings, 20 represents a coal hopper mounted upon a hopper base 21. A conventional type of furnace 22 embodies a retort structure 23 which comprises a fire-bowl 24, a conduit portion 25 and an air chamber 26 which is extended through the hopper base 21 and communicates with a fan housing 27 attached to the hopper base. A fan 28, operating within the housing 27, supplies air under pressure to the air chamber 26 from which it is delivered to the fire-bowl 24 through a plurality of openings 26a. 29 is a screw type conveyor which has its receiving end disposed within the hopper base 21 and extends therefrom through the conduit 25 into the fire-bowl 24. Thus conveyor 29 is adapted to transport coal from the hopper 20 to the fire-bowl 24 and the fan 28 to supply air to the fire through the chamber 26. While the aforesaid elements of a stoker and furnace are more or less commonplace per se, they enter into this subject matter insofar as they are combined with the novel elements of this invention.

The driving mechanism for the conveyor 29 and the fan 28 may comprise any form of power device but, in this instance, I have shown an electric motor 30 having a drive shaft 31 upon which are mounted the fan 28 and a drive pulley 32.

In order to use a constant speed motor of standard type and number of R. P. M. and yet obtain a regulable and relatively slow speed of the conveyor 29 together with noiseless operation and a high efficiency in the transmission of power from the motor to the conveyor, I employ a novel form of power-transmission and speed-regulating device designated generally as 33. This device embodies a drive shaft 34, suitably mounted in a housing 35, and having secured thereto a pulley 36 which is operatively connected to the pulley 32 by means of a suitable belt 37. Secured to the shaft 34, or preferably integral therewith, is a worm 38 having toothed engagement with a worm-wheel 39 which is keyed by a member 40, or otherwise anchored, to a rotatable member 41 loosely journaled on a shaft 42 which is rotatably supported at one end in a portion 35a of housing 35 and at the other end in a cap member 43 suitably mounted on the housing 35 and secured thereto by bolts or screws 44. Journaled in the member 41, on an axis spaced from the axis of shaft 42, is a shaft 45 which carries a plurality of pinion gears 46, 47, 48 and 49 keyed thereto by the key 50. The pinion gears 46, 47 and 48 are of different diameters and have toothed engagement with internal ring gears 51, 52 and 53 respectively, also of different diameters, the said ring gears being suitably supported for rotation within the housing 35. The pinion gear 49 has toothed engagement with an internal gear 54 which is keyed by a member 55, or otherwise anchored, to the shaft 42. Thus the transmission of power from shaft 34 to shaft 42 is accomplished by means of a planetary gear drive if and when either of the ring gears 51, 52 and 53 is held against rotation and it will be noted that the speed of shaft 42 is controlled by the selection of the gear so held. For example: if gear 53 is held against rotation, shaft 42 will be driven at the slowest relative speed; if gear 51 is so held, the said shaft will be driven at the fastest relative speed; and if gear 52 is held, the said shaft will be driven at the medium speed; and if neither ring gear is held, shaft 42 will not be driven but will remain dormant; in other words, the status of the ring gears determines whether or not shaft 42 will be driven. To these ends I have provided each ring gear with a notch 56 and there is also provided a plurality of detents 57, 58 and 59—one for each ring gear. These detents are pivotally supported upon a rigid yoke-shaped structure 60 which is anchored to a detent crank-shaft 61 mounted for pivotal movement in the housing 35 and normally secured against such movement and held under stress by a pin 62 carried by a housing extension 35b and extending freely through a hole in the shaft 61. The structure 60 may be constructed as one piece or, as shown, it may comprise arms 60a, spaced apart and anchored to shaft 61 with a rod 60b extending therebetween on which the detents are pivoted. In order to provide for withholding the detents 57, 58 and 59 from engagement with the notch 56 in the respective ring gears and thus cause the shaft 42 to be dormant when desired, and further to provide a means for selecting a particular detent for engagement with its respective ring gear in order to cause the shaft 42 to rotate at the desired speed, I have provided a shaft 63 having a facet 63a and an operating handle 64, the said shaft being slidably and pivotally supported at each end in the housing 35 and extending through openings 57a, 58a and 59a in the respective detents which are imposed upon the said shaft by gravity. The facet 63a is slightly wider than the thickness of a detent so as to permit one of the detents to drop into engagement with the notch in its ring gear when the said facet is longitudinally aligned with the detent. In order to define the longitudinal position of shaft 63 and thus align the facet 63a with a particular detent, and to limit the pivotal movement of the said shaft, there is provided a housing cover plate 65 attached to housing 35 by screws 66 and having an extension 65a wherein the handle 64 is confined and made subject to being indexed into one of three recesses 65b, 65c and 65d corresponding to the three detents representing the three different speeds of the shaft 42. For example: if handle 64 is positioned in recess 65b, the shaft 63 will be positioned radially and longitudinally as shown in Figs. 3, 4, 5 and 7 and detent 57 will be permitted to engage the notch 56 in ring gear 51, holding said gear against rotation, and thus cause the shaft 42 to be rotated, by means of the planetary gear drive, at a speed relative to the gear ratio thus selected. And it will be apparent that if handle 64 is positioned in recess 65c, detent 58 will hold ring gear 52 thus establishing a relatively slower speed of shaft 42; whereas, if handle 64 is positioned in recess 65d, then detent 59 will hold ring gear 53 and this will establish a still slower speed of shaft 42. On the other hand, if handle 64 is positioned radially as shown in dotted lines in Fig. 5, regardless of the longitudinal position of shaft 63, none of the detents will be permitted to engage any of the ring gears which will thus be free to rotate with the result that the shaft 42 will remain dormant.

As clearly shown in Fig. 4, a shaft 42 is preferably arranged to have a non-severable connection with conveyor 29—that is, a connection which will withstand the maximum of power delivered by the motor. To that end, I prefer to provide a square socket 29a in the end of conveyor 29 and a squared section at the end of shaft 42 for engagement with said socket but it will be apparent that other staunch forms of driving connection will serve equally as well.

Inasmuch as the functioning of conveyor 29 causes an end thrust thereof toward shaft 42 when said shaft is rotating, the socket 29a is held securely into engagement with said shaft without any fastening device and therefore this form of connection is particularly advantageous for assembling and disassembling—in making replacements—and otherwise. If desired, the longitudinal thrust imparted to shaft 42 by conveyor 29 may be transmitted to an anti-friction bearing, such as the ball thrust bearing 43a mounted in cap member 43, and the driving mechanism within housing 35 may be suitably lubricated by charging the housing with a generous supply of lubricant which will be sufficiently agitated by the churning action of the gears and other moving parts as to assure lubrication for all wearing surfaces. To prevent escape of lubricant around shaft 42, any form of shaft seal, such as 67, may be used and the joint between the housing 35 and cap 43 may be sealed in any suitable manner, as by a gasket.

In the event that the conveyor 29 becomes overloaded due to the lodgement of any foreign substance, or otherwise, I have provided novel power-releasing means for protecting the mechanism against damage—in other words, a safety device. This means may comprise a shear-pin, such as the pin 62 which, as previously noted, is carried by the housing extension 35b and fixes the normal radial position of the detent crank-shaft 61, as in Fig. 9; or it may take the form of a resilient indexing device, such as the plunger 68 and spring 69, the former of which is mounted for sliding motion in the housing 35 and normally engages a cam notch in a member 70 anchored to the detent crank-shaft 61 by a key 71, as shown in Fig. 11, or otherwise. In either case, the normal radial position of the detent crankshaft 61 is such that a detent may be positioned to hold a ring gear against rotation, as shown in Fig. 7. Thus the "pull" of the planetary drive is transmitted through the ring gear, the detent, the structure 60 and shaft 61 to the pin 62 or the plunger 68, all of which are under a stress proportionate to the load on conveyor 29. When the load on the said pin or plunger exceeds a desired maximum, the said pin will shear (as shown in Fig. 10) or the plunger 68 will be cammed out of the notch (as shown in Fig. 12) with the result that the detent crank-shaft 61 will be freed as to rotation and the dormant ring gear will be released from the restraining influence of the detent which will automatically become disengaged from the notch 56 in the ring gear, as shown in Fig. 8. It will be understood that the shearing strength of pin 62, or the angle of the notch in member 70 together with the power of spring 69, determines the maximum load allowed.

After the cause of the overload has been removed, normal operation may be resumed by restoring shaft 61 to its normal radial position. In order to facilitate resetting of shaft 61, the said shaft may be provided with a restoring arm 72 which may be secured thereto in any suitable manner, as by a set screw 73, as shown in Figs. 9 and 10 or the member 70 may be provided with an extension 70a, as in Figs. 11 and 12. Furthermore, it will be apparent that this arrangement provides a means for indicating whether or not conveyor 29 is operating as the position of arm 72 or extension 70a is indicative.

I have also provided means for automatically throwing off the electric current to the motor, or for energizing an annunciator circuit, or both, when shaft 61 is released by the shearing of pin 62 or otherwise. This may be accomplished in various ways by employing any suitable type of circuit control, but, as shown in Figs. 9 to 12 inclusive, I have provided a mercury tube switch 73 held within a pocket in arm 72, or in extension 70a, and embodied in the motor circuit 74 having a main switch 75 so that, when the detent crank-shaft 61 is in its normal radial position, the mercury will maintain a closed circuit, as shown in Fig. 9, but when the said shaft is released, as shown in Fig. 10, the mercury will flow to the opposite end of the tube thus opening the circuit and shutting off the power to the motor. Or as shown in Fig. 13, if desired, a separate circuit 76 may be provided including a battery 77, and an annunciator such as a buzzer or bell 78 and/or a lamp 79. In this instance the mercury tube would be arranged to maintain an open circuit when the detent crankshaft 61 is in its normal radial position but upon releasing of said shaft by the shearing of pin 62 or otherwise, the mercury will flow to the opposite end of the tube thus closing the circuit and energizing the annunciator. It will be obvious that both forms of control may be employed in the same device by the use of either two separate mercury tubes mounted in arm 72 or a single tube with the motor circuit 74 at one end and the annunciator circuit 76 at the other.

From the foregoing it will be apparent that the construction of the power-transmission and speed regulating device herein provided accomplishes new and beneficial results that are distinctly advantageous from a number of standpoints. Internal planetary gearing is stronger and more durable than the kind of spur gearing usually employed for this purpose; it is practically noiseless; does not require shifting of gear teeth from one engagement to another in order to vary the speed ratio; enables changes of speed while gears are in operation; and permits of the adaptation of speed changing means that is foolproof and silent in operation and quickly controlled by a mere finger-touch. Furthermore, this form of driving mechanism permits of the embodiment of a mechanical safety device that can be associated with a normally dormant member—a device which is readily accessible and so simple as to enable the merest novice to instantly restore it to normal operation without danger or the use of any tools; and one which can be adapted to control an electric circuit. Thus the various objects herein set forth have been attained.

Having thus fully described my invention, what I claim as new and desire to secure by Letters Patent, is:

1. A transmission mechanism having a drive shaft and a normally driven shaft mounted in a casing, a geared connection between said shafts arranged so as to normally provide a driving connection therebetween, a normally stationary shaft pivotally supported in said casing, a detent operatively connected to said normally stationary shaft at a point spaced from the axis thereof and normally disposed in engagement with said geared connection so as to give driving effect thereto whereby said stationary shaft is normally subjected to torsional stress induced by the load on said driving connection, and a shear-pin disposed so as to pass through said stationary shaft and a portion of said casing in order to normally secure said stationary shaft against pivotal movement in respect to said casing, said geared connection becoming ineffective as to the driving effect when an abnormal load on said driven shaft causes severance of said shear-pin and releases said stationary shaft for pivotal movement thereby causing disengagement of said detent from said geared connection.

2. In a power unit, a planetary gear transmission mechanism mounted in a casing and having a driven connection with a power device and a driving connection with a driven member, said mechanism comprising a normally dormant ring gear, displaceable means to hold said gear in such normal status, said means comprising a normally stationary shaft and a detent, said shaft being pivotally supported in said casing and said detent being disposed so as to effect locking engagement with said gear and pivotal engagement with said shaft at a point spaced from the axis thereof so that said shaft may be normally subjected to torsional stress by the load on said gear, and a shear-pin disposed so as to pass through said shaft and a portion of said casing in order to resist said stress and normally secure said shaft against pivotal movement with respect to said casing, said shear-pin being made ineffective by severance when the load on said gear becomes abnormal thus permitting pivotal movement of said shaft and consequent disengagement of said detent from said gear whereupon said transmission mechanism will become ineffective.

3. The combination in a power transmission unit having a drive shaft and a driven shaft mounted in a casing, a train of gears including a plurality of internal orbit gears and a corresponding plurality of planet gears meshing therewith and having a common driven connection with said drive shaft and a common driving connection with said driven shaft, one of said orbit gears being held normally dormant, displaceable means to hold said gear in such normal status, said means comprising a normally stationary shaft and a detent, said shaft being pivotally supported in said casing and said detent being disposed so as to effect locking engagement with said orbit gear and pivotal engagement with said shaft at a point spaced from the axis thereof so that said shaft may be normally subjected to torsional stress by the load on said orbit gear, and a shear-pin disposed so as to pass through said shaft and a portion of said casing in order to resist said stress and normally secure said shaft against pivotal movement with respect to said casing, said shear-pin being made ineffective by severance when the load on said orbit gear becomes abnormal thus permitting pivotal movement of said shaft and consequent disengagement of said detent from said orbit gear whereupon said train of gears will become ineffective as to power transmission.

4. The combination in a power transmission unit having a drive shaft and a driven shaft mounted in a casing, a train of gears including a plurality of internal orbit gears and a corresponding plurality of planet gears meshing therewith and having a common driven connection with said drive shaft and a common driving connection with said driven shaft, displaceable means to hold a selected orbit gear normally dormant, said means comprising a normally stationary shaft and a detent, said shaft being pivotally supported in said casing and said detent being disposed so as to effect locking engagement with said selected orbit gear and pivotal engagement with said shaft at a point spaced from the axis thereof so that said shaft may be normally subjected to torsional stress by the load on said selected orbit gear, manually operated means to effect the selection of an orbit gear by controlling the locking engagement of said detent, and a shear-pin disposed so as to pass through said shaft and a portion of said casing in order to resist said stress and normally secure said shaft against pivotal movement with respect to said casing, said shear-pin being made ineffective by severance when the load on said selected orbit gear becomes abnormal thus permitting pivotal movement of said shaft and consequent disengagement of said detent from said selected orbit gear whereupon said train of gears will become ineffective as to power transmission.

RALPH W. HALL.